June 16, 1936.    N. H. KLAGES    2,044,577
GLASS CUTTING MACHINE
Filed June 11, 1935    3 Sheets-Sheet 2
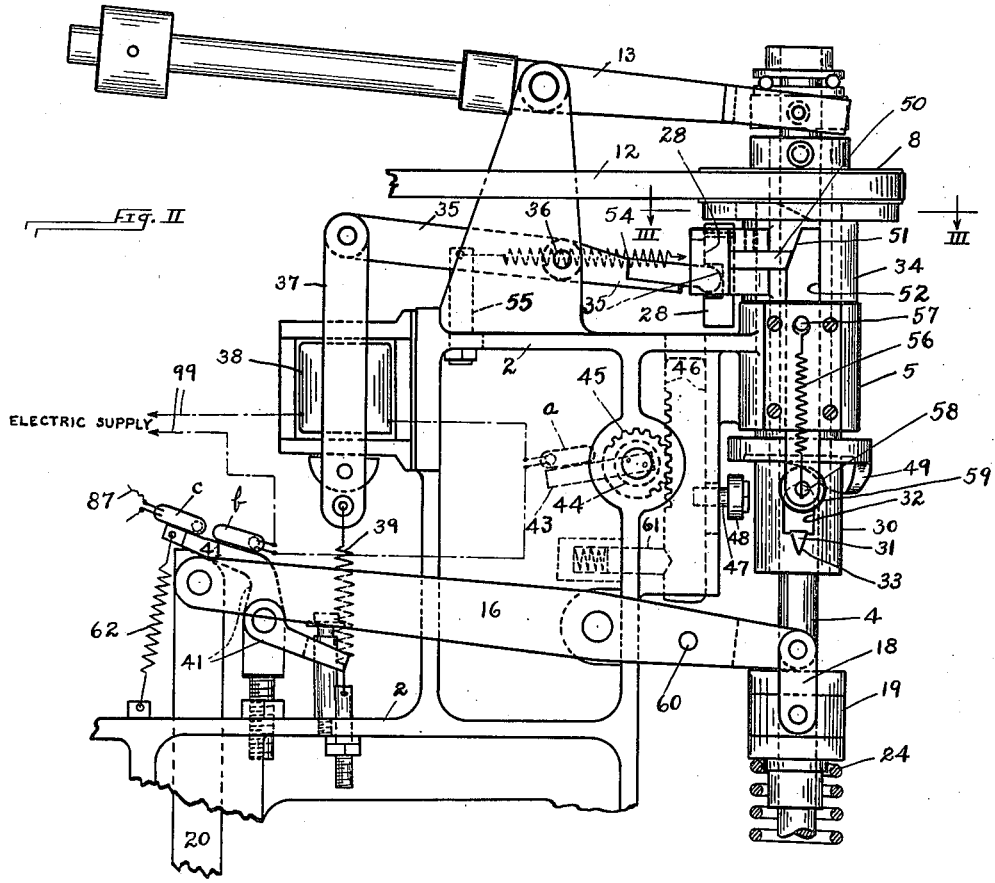
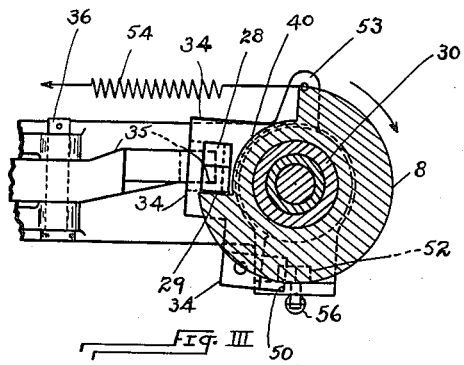
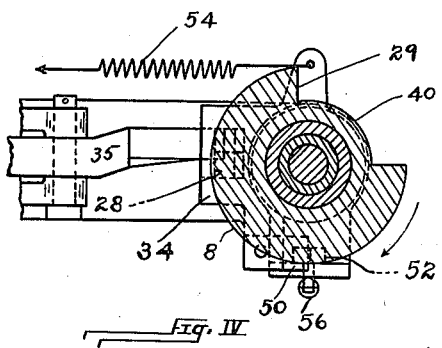
INVENTOR
Norman H Klages
by Christy and Wharton
his attorneys

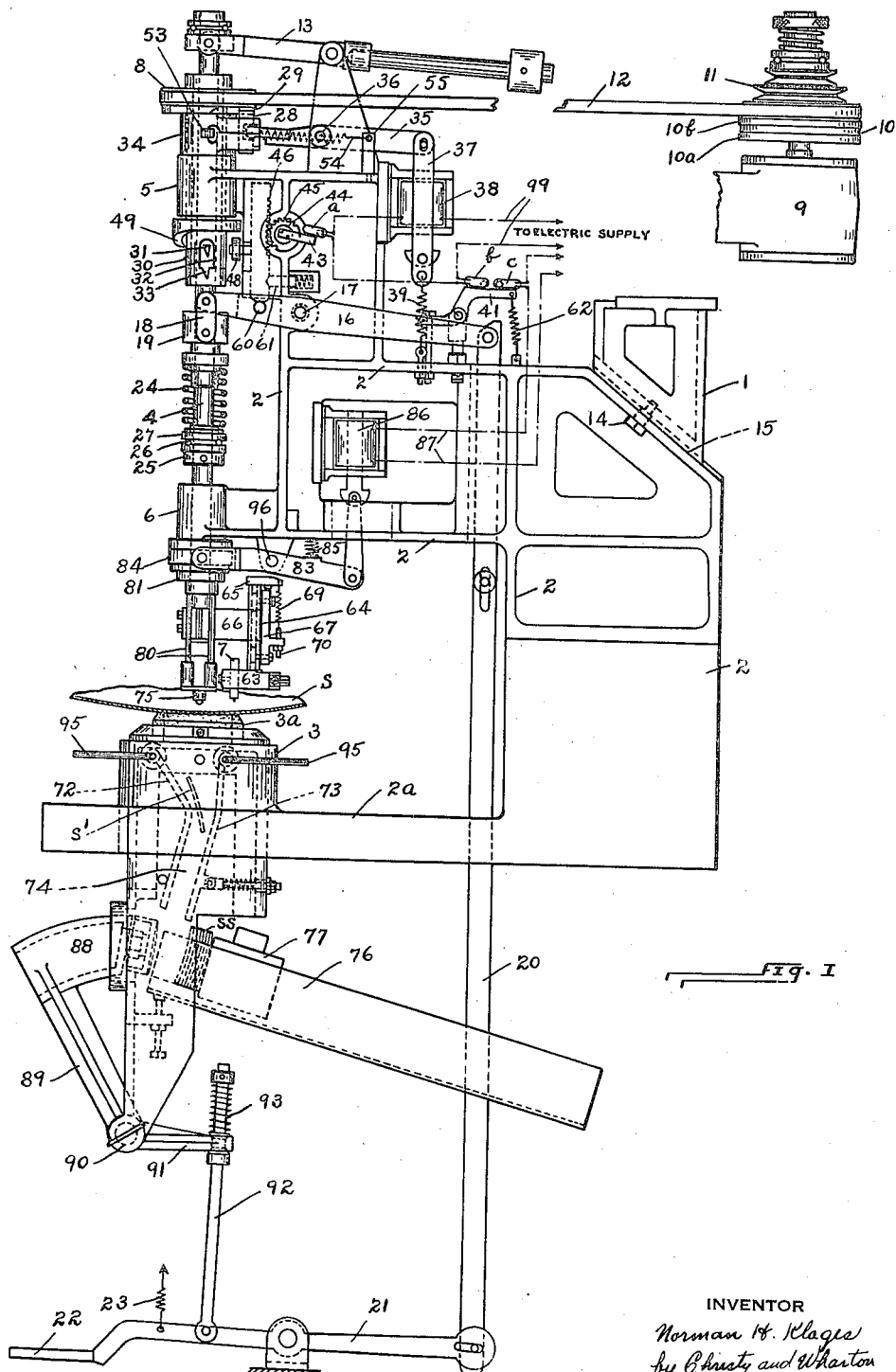
Fig. I

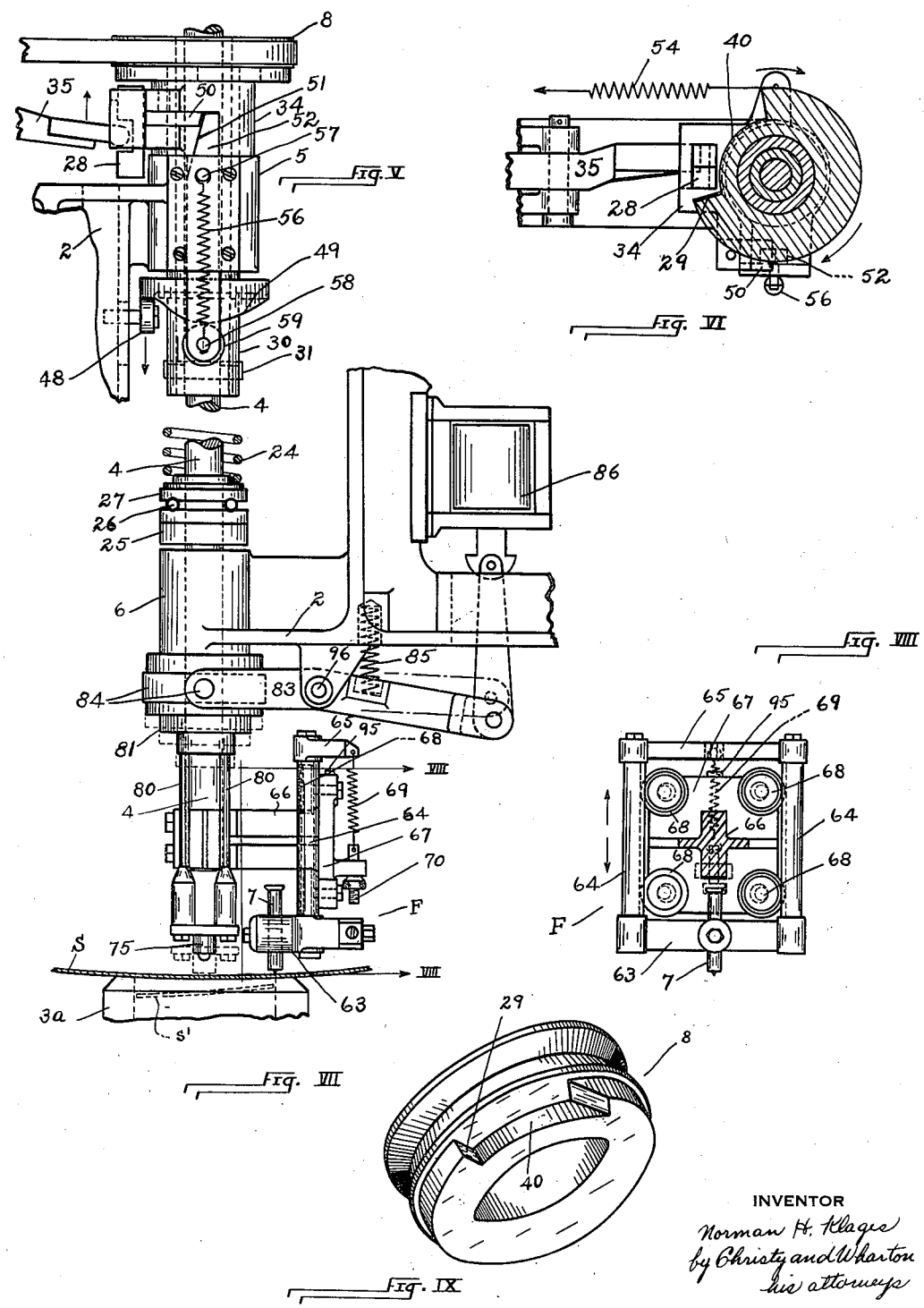

Patented June 16, 1936

2,044,577

UNITED STATES PATENT OFFICE 2,044,577

GLASS-CUTTING MACHINE

Norman H. Klages, Pittsburgh, Pa., assignor to L. J. Houze Convex Glass Company, a corporation of Pennsylvania Application June 11, 1935, Serial No. 25,980

20 Claims. (Cl. 49—48)

My invention relates to glass cutting, and consists in a powerfully driven machine for cutting spectacle glasses from sheets of spherical curvature.

A machine of the sort to which the invention relates essentially includes a cutting tool which is adapted, when brought to bear upon a sheet of glass, to cut a circle, or an ellipse, or other figure (depending upon the particular shape desired), whereby the portion within the cut may be removed from the sheet. By way of illustration and not limitation, the invention will be considered as it is employed to cut circular spectacle glasses. I shall, for convenience, in further description speak of these cut-out spectacle glasses as discs; and I wish it to be understood that I mean to include within the meaning of that term cut-out portions of whatever shape—circular, elliptical, or of other outline.

The tool carries a diamond, to do the actual cutting of the glass. In order to obtain perfectly cut discs the tool in its path upon the sheet must describe exactly a circle (or other predetermined figure), no more, no less; that is, the end of the cut must terminate precisely at its starting point; the diamond point must carry to, but may not, even for the smallest fraction of an inch, carry beyond, the point of beginning. It is a practical requisite also that the diamond shall bear upon the glass with a pressure that is substantially constant and neither too small nor too great. My invention comprises certain refinements and elaborations in the structure of disc-cutting machinery, to the end that such desiderata may be realized in a power-driven machine capable of operating at high speed.

The machine of the invention further includes means for automatically removing from the sheet of glass the portion cut therefrom, and advantageously such means are organized to operate in coordination with the cutting tool.

In the accompanying drawings, Fig. I is a view in side elevation showing the essential parts of a machine embodying the invention; Fig. II is a fragmentary view, showing to larger scale, and in side elevation, the upper portion of the machine. In Fig. II the machine is viewed from the side opposite that of Fig. I. Figs. III, IV, VI are fragmentary views, showing in cross-section (on the plane III—III, Fig. II) particular parts of the machine in successive positions of operation; and Fig. V is a fragmentary view, showing in side elevation these parts in the positions shown in Fig. IV. Fig. VII is a fragmentary view in side elevation, corresponding to Fig. I, but to larger scale, showing the tool mounting of the machine. Fig. VIII is a view in vertical section, on the plane VIII—VIII of Fig. VII. And Fig. IX is a view in perspective of a particular pulley embodied in the machine.

The machine includes in its structure a stationary support 1. Secured upon support 1 is a frame 2 including a horizontal table portion 2a that carries a support 3 for the sheet of glass from which the discs are to be cut. In the better grades of spectacles, the glasses are required to be of spherical curvature, and to meet this requirement the sheet upon which the machine of the invention operates is a fragment of a spherical shell of blown glass. The thin wall of the blown sphere is cut into sections, providing the curved sheets alluded to. Such a spherical sheet is shown in section at s in Fig. I, resting upon the support 3, and in position for the machine to work upon it. The cutting of discs from a spherical sheet is attended with difficulties which obviously are not encountered in cutting discs from a plane sheet, and, manifestly, a machine for the purpose here contemplated must be delicately sensitive and precise in its various operations. With these thoughts in mind, it will be understood that the structural refinements and elaborations of the machine of this invention are particularly, although not exclusively, adapted for this more difficult class of work.

As in the usual disc-cutting machines, I provide a vertical spindle 4, rotatably supported in bearings 5 and 6, and carried by the frame 2. A diamond pointed cutting tool 7 is carried on an arm that extends from the lower end of the spindle, and a pulley 8, mounted upon the upper end of the spindle, is adapted to be intermittently rotated, to turn the spindle through 360 degrees. One rotation of the spindle causes the point of the tool 7 to advance through a circle, and to inscribe a circular cut upon the sheet of glass supported beneath it.

The means for rotating the spindle 4 include an electric motor 9 that continuously rotates the lower disc 10a of a friction clutch 10; the upper disc 10b of the clutch carries a pulley 11 including three belt grooves of different circumferences, and a belt 12, engaged in one or another of the grooves, extends from the pulley 11 and is trained over the spindle pulley 8. Advantageously, the frame 2 of the machine is secured, by means of one or more screws 14, in an inclined tongue-and-groove engagement with the stationary support 1, as indicated at 15. By loosening screw 14, the frame 2 may be adjusted along the incline, whereby the frame 2 and all of the cooperating elements of the machine carried thereby may be adjusted both vertically and laterally, in such manner that the pulley 8 may be positioned for the belt to operate in any desired one of the grooves in pulley 11. Thus, three speeds of spindle rotation may be obtained for a given speed of rotation of the motor 9.

The spindle 4 is vertically reciprocable in the bearings, in order to lower the cutting tool 7 into position of engagement with the sheet s, and to restore it to its elevated position of rest. A counterweighted lever 13 is organized in well-known manner with the upper end of the spindle 4, and tends to sustain the spindle in its elevated position. A lever 16, fulcrumed at 17 to the frame 2, is connected at its outer end (by means of links 18) to a follower block 19 which is idly mounted on the spindle. A collar 25 is secured to the spindle, and between such collar and the block 19 a compression spring 24 is mounted. A race of anti-friction bearings 26 is disposed between the collar 25 and an idler disc 27 upon which the spring immediately bears, whereby the spring, conveniently, does not rotate with the spindle nor with the collar 25. The inner end of the lever 16 is pivotally connected to the upper end of a vertically extending connecting rod 20, and a treadle lever 21, whose treadle 22 is normally retained in elevated position by means of a tension spring 23, is pivotally connected to the lower end of said rod. The pressing of the treadle, and the consequent swinging of the lever 21 against the resistance of spring 23, causes the rod 20 to rise, swinging the lever 16 counter-clockwise, and forcing the follower block 19 downward. The descent of the follower block compresses spring 24 to such point that the resistance of the spring to further compression equals the force required to swing the counterweighted lever 13, whereupon the continued descent of the follower block is effective to carry the spindle 4 with it. Thus, the pressing of the treadle 22 is effective yieldingly to force the spindle downward, and thereby to bring the cutter 7 to engagement with the work s. Alternately, upon relieving pressure on the treadle, the spring 23 raises the block 19, and the counterweighted spindle 4 rises to the inactive position.

The spindle 4 extends through a sleeve 30 which is rotatably mounted in the upper bearing 5 of the machine, and the pulley 8 is secured to this sleeve. The spindle and sleeve are interconnected for common rotation, and the connecting means comprise a transverse pin 31 borne by the spindle, and two diametrically opposite, vertical slots 32 formed in the sleeve. The pin 31 at its opposite ends projects into the slots. The slots at their lower ends terminate in V-shaped notches 33, and the pin at its ends is of corresponding V-shape. In the elevated, idle position of the spindle, the ends of the pin 31 extend within the upper wider portions of the slots 32, as indicated in Fig. I; but when the spindle is shifted to its lower, working position, the ends of the pin engage the notches 33, as indicated in Fig. II, and afford tight union of spindle and sleeve for common rotation. While an unspecialized pin-and-slot connection of usual type would insure rotation of the spindle when the sleeve is rotated, I have found that in service the vertical reciprocation of the spindle, and the accompanying sliding engagement of the pin in the slot, tend to produce such wear of the parts that sooner or later angular play between the spindle and the sleeve is noticeable. Of course, the presence of such play or backlash would destroy minute accuracy in the operation of the machine. In my specialized connection, however, the wear which is incident to the engagement and disengagement of the pin 31 in the V-shaped notches 33 is self-compensating; that is to say, the more the wear the deeper the penetration of the ends of the pin into the V-shaped slots; so that, regardless of wear, the engagement intermittently established between the sleeve and the spindle is always accurate and secure.

The pulley 8 is positively restrained from rotating, so long as the spindle 4 rests in its elevated position, and, while the pulley 8 is so restrained, the belt 12, the pulley 11, and the upper clutch disc 10b remain idle. The lower clutch disc 10a, being continuously driven by the motor 9, rotates in frictional engagement with the idle disc 10b and exerts a constant torque, tending to rotate the pulley 11. Alternately, when the spindle is lowered to bring the cutter 7 to bear upon the sheet of glass s, the restraint upon pulley 8 is removed; thereupon the upper clutch disc 10b rotates in unison with the lower and in so doing drives the pulley 8, and with it sleeve 30, and (through pins 31) spindle 4. And means are provided for insuring that such rotation of the spindle shall be through exactly 360 degrees, whereby the cutter 7 shall be turned precisely through a single revolution.

The body of pulley 8 extends downwardly from its belt-engaged portion, and in such downwardly extending portion its cylindrical continuity is interrupted by a sector-shaped recess 40. The angular extent of this recess is not a matter of controlling importance; it is here shown to be 90° in extent, cf. Fig. IX.

Immediately beneath pulley 8 and between it and bearing 5 a block 34 is interposed. Block 34 carries in a suitable vertically extending guideway a bolt 28 that may be advanced into or retracted from the sector-shaped recess 40 in the body of pulley 8. When bolt 28 is advanced the end wall 29 of the sector-shaped recess in the body of pulley 8 abuts upon it. The bolt 28 then locks the pulley (and with it the sleeve 30) against rotation. When the bolt is withdrawn the pulley and sleeve are free, and rotate in response to the driving stress of belt 12. The bolt 28 is engaged by a lever 35 that is fulcrumed, 36, in the frame of the machine, and by the swinging of the lever the bolt is shifted to and from pulley-locking position. The lever is subject to the constant tension of a spring 39 and to the intermittent and oppositely effective and greater stress exerted by an electro-magnet 38. When the electro-magnet is deenergized the tension of spring 39 is effective to maintain the lever at one end of its range of swinging and the bolt 28 raised and in pulley-locking position. When the electro-magnet 38 is energized the tension of the spring is overcome, the lever is swung (clockwise, Fig. II) and the bolt is withdrawn (as, in Fig. II, it is shown to be). The circuit 99 through which the electro-magnet is energized includes a make-and-break device b, mounted on a swinging arm 41. As the arm is swung clockwise (Fig. II) the make-and-break device (here shown as a mercury switch) is closed; as the arm is swung oppositely the make-and-break device breaks the circuit. The swinging of arm 41 is correlated to the shifting of spindle 4. The depressing of treadle 22 effects the upward shift of connecting rod 20 and through this rod the downward shift of spindle 4; and the arm 41 is so arranged as to be engaged by the rising rod 20 and shifted against the tension of a spring 62. By the means described the depressing of the treadle, that brings the cutter to bear upon the glass, releases pulley 8, to allow the spindle-borne cutter to be driven by motor 9. This coordination of operation is so limited and controlled that the pulley 8 turns through exactly one revolution and the cutting tool 7 travels through precisely a three-hundred-and-sixty degree turn, and then stops.

Provision is made that the momentum of the rotating spindle 4 and the cutting tool 7 shall be absorbed and the tool brought to rest at the end of its cutting revolution with no rebound nor backlash. To such end the block 34 that carries the bolt 28 is rotatable upon the sleeve 30, and a narrowly confined range of rotation of the block suffices. When bolt 28 has been withdrawn from pulley 8, so that pulley 8 is allowed to rotate, the block 34 itself rotates in opposite direction, through a slight but sufficient interval. The bolt 28 is thus caused to advance circumferentially. Meanwhile (through instrumentalities presently to be described) the bolt 28 is returned to its position of extension, so that the face 29 of the sector-shaped recess in the body of pulley 8 abuts upon it again before the pulley has completed one rotation. So abutting, the pulley carries block 34 with it against the tension of a momentum-absorbing spring, until at length, on the completion of the rotation, the interlocked and rotating parts come positively to rest. And, while the interlocked and rotating parts are approaching such position of rest, a wedge-shaped bolt advances and affords bodily opposition to rebound.

Another make-and-break device, in the form of a mercury switch $a$, borne upon a swinging arm 43, is included in the circuit 99 that energizes electro-magnet 38. The shaft 44 from which the arm 43 extends carries a pinion 45. A rack 46, mounted in the frame of the machine and normally held in raised position by a yielding detent 61, engages the pinion. The rack is equipped with a stub shaft 47 that carries a roller 48. The sleeve 30 is equipped with a cam 49, and the parts are so arranged that with the rotation of sleeve 30 the rack is shifted downward (Fig. II), the shaft 44 turned, the switch opened, and the electro-magnet de-energized. Thereupon spring 39 is effective to swing lever 35 and bring bolt 28 again to its initial upwardly extended position.

The block 34 is locked to the bearing 5 by a bolt 52. The bolt 52 is reciprocable in a vertically extending guideway in bearing 5. The upper end of the bolt 52 is wedge shaped, providing an obliquely extending face 51, upon which an abutment 50 rigidly borne by block 34 bears. A spring 54, anchored at 55 to the frame of the machine, exerts upon block 34 a constant force, tending to turn the block counter-clockwise (Figs. III, IV, and VI); thus the block is caused to bear through abutment 50 upon the bolt 52. A spring 56 tends constantly to hold bolt 52 in upwardly extended position (Fig. II), and the bolt 52 carries on a stub shaft 58 a roller 59. The same cam 49 that shifts the rack 46 is so proportioned and arranged that, in the course of a single rotation of sleeve 30, it first effects the withdrawal and then permits the extension again of bolt 52. The extreme positions of bolt 52 are shown in Figs. II and V. This cam-controlled movement of bolt 52 is coordinated with the retraction and extension of bolt 28, to effect the ends indicated, namely—first, bolt 28 is withdrawn; second, the released pulley 8 begins its rotation; third, bolt 52 gradually recedes and with corresponding progress block 34 under the tension of spring 54 turns through a limited small range of turning; fourth, bolt 28 advances again under the tension of spring 39 and enters the sector-shaped recess in the body of pulley 8; fifth, the face 29 of pulley 8 engages bolt 28 and the pulley then, continuing in rotation, carries block 34 back through its slight range of turning, and the momentum of the turning parts is absorbed by the expansion of spring 54. Meanwhile, sixth, the bolt 52 advances into extended position, and the parts come snugly to rest again, in the positions shown in Fig. II.

The obliquity of the face 51 of bolt 52, upon which the abutment 50 bears, is such that the tension of the spring 54 cannot (overcoming that of spring 56) prevent the rise of the bolt 52. The connection between the end of lever 35 and the bolt 28 is such as to permit lateral play, with allowance for the limited rotation of block 34 without disturbing the articulation of these parts.

In the above-described manner, the depression of the treadle causes the machine automatically to describe a circular cut in the sheet of glass $s$. Upon releasing the treadle, the counterweighted spindle 4 rises to the inactive position shown in Fig. I. The lever 16 swings counter-clockwise (Fig. II) and a pin 60, borne by lever 16, engages the lowered rack-gear 46 from beneath and carries it back to its normal position, in which the detent 61 stays it. In this way the mercury switch $a$ is restored to its normal circuit-closing position. As for the switch $b$, the descent of the rod 20 (in response to the release of the treadle) frees the arm 41 to the influence of spring 62; the arm then turns counter-clockwise (Fig. II), and restores the switch $b$ to its normal circuit-interrupting position (Fig. I).

An arm 66, extending from the lower end of the spindle 4, carries at its outer end a vertically disposed plate 67. The plate 67 is equipped with two pairs of bearing wheels 68. The two wheels of each pair are vertically aligned, and the two pairs are spaced apart horizontally. The wheels lie in common plane. The tool carrier F includes two posts 64 that extend vertically between two rigid cross-bars 63 and 65. Upon their inner faces, the posts 64 are grooved, and the proportions are such that the wheels 68 enter the grooves. The tool carrier is vertically movable in such bearing, the wheels turning as the tool carrier moves up and down. A spring 69 adds its tension to the weight of the tool with its carrier in holding the tool to its work. Fig. VIII shows that, by forming the wheels individually of inner and outer parts, of which the inner is eccentric with respect to the axis of wheel turning, the wheels may be shifted in their spacing, to adjust for wear between the wheels and the posts they engage. The effective tension of spring 69 is adjustable by means of a screw 70.

Already it has been explained that the thrust of the treadle 22 is imparted to spindle 4, to drive it downward, through the spring 24. As the spindle descends, and the cutter 7 makes contact with the work, it is the more delicate spring 69 that yields, and by virtue of the delicacy of the above-described mounting of the tool carrier upon the arm 66, it is the more delicate spring 69 that, by minute expansion and contraction, affords compensation for minute variations in the thickness and sphericity of the sheet of glass $s$ from which the discs are cut.

Advantageously, means are provided in the apparatus for automatically knocking out the disc of the glass from within the cut described by the tool 7. It will be observed in Fig. I, that the support 3 is provided with a yielding ring 3a, say of felt, upon which the sheet of glass immediately rests. The internal diameter of the ring 3a is slightly greater than the diameter of the discs that are cut. The body of the support 3 below the ring is internally recessed, and within are arranged two guiding plates 72 and 73 that are pivotally supported at their upper ends. The two guiding plates 72 and 73 define between them a passage 74, to which the glass-supporting ring opens. Above the sheet of glass, a knock-out tool 75 is reciprocable. It is carried by four legs 80 that (equispaced around the spindle 4) extend from a block 81 (see Fig. VII). Reciprocation is imparted to the knock-out tool by the oscillation of a lever 83, fulcrumed at 96. The block 81 is arranged concentrically of the spindle 4, but is vertically movable independently thereof. A slip-ring connection 84 of the lever 83 to the block admits of rotation of the block and legs 80 with the spindle. The inner end of the lever 83 is connected to the armature of a normally deenergized electro-magnet 86, and a compression spring 85 cooperating with the lever tends normally to hold the block 85 in position against the bearing 6, with the knock-out tool 75 clear of the work and out of the way. The energizing circuit 87 of the electro-magnet 86 (Fig. I) includes a make-and-break device, here illustrated as a mercury switch c, mounted upon the arm 41, already described. The mounting of the switch c is such that its globule of mercury tends to remain away from the contact poles of the switch, in whatever position the arm may stand. In the normal, idle position of the arm (Fig. I) the mercury remains in circuit-interrupting position in the switch; when the arm is tilted and brought to the position for closing switch b (Fig. II), thereby effecting a disc-cutting operation of the cutter 7, the globule of mercury in switch c still remains in circuit-interrupting position. When, however, at the termination of a disc-cutting operation, the treadle 22 is quickly released, and the arm quickly turns from its inclined position (Fig. II) to its horizontal position of rest (Fig. I), momentum and centrifugal force are effective to carry the globule of mercury in switch c into circuit-closing engagement with the contact poles of the switch. Although the mercury immediately thereafter falls away from the poles and returns to the lower end of the switch, the momentary closing of the circuit 87 suffices to energize the electro-magnet 86, raise its armature, and swing the lever 83. The knock-out tool 75 is caused sharply to strike the center of the area of glass within the circular cut last made by the cutter 7; the disc of glass, thus detached along the line of the cut, is carried downward through the resilient ring 3a, whence it falls into passage 74. The spring 85 is effective immediately after the delivery of the blow to return the parts to normal inactive position.

An inclined collecting trough 76 is arranged with its higher end beneath the passage 74. The guide plates 72, 73 are so formed and arranged that the detached disc of glass (cf. S' in Fig. I) is caused, during its descent through the passage 74, to turn into a vertical position and to fall on edge into the trough. A block 77 slidably rests in the trough, and serves to support the discs in upright position. A rubber-tipped finger 88 is integrally mounted upon the arm 89 of a bell-crank lever, adapted to swing about an axis 90, and the companion arm 91 of the lever is connected by a rod 92 to the treadle lever 21. Each time that the treadle 22 is pressed to effect a disc-cutting operation of the apparatus, the lever 89, 91 is swung clockwise, carrying the finger 88 into the upper end of the trough and pushing the disc last introduced to the right of the discharge end of passage 74. As the discs intermittently fall into the trough, and the finger 88 intermittently pushes them to the right, the block 77 gives way, whereby the discs are automatically stacked, as indicated at ss in Fig. I. It may be observed that the downward pull of rod 92 on the bell-crank lever is transmitted through a compression spring 93, and thus the force of the finger 88, tending to push the line of discs along the trough, is yieldingly applied.

Another detail remains to be mentioned. The guiding plates 72 and 73 are adapted to be jiggled, in case a disc should become stuck in the passage 74, and to such end the pins, upon which the plates are pivotally mounted in the support 3, are each continued in an angular extension 95. The attendant may angularly oscillate the extensions 95 and produce the jiggling of the plates when required.

It is known in hand-driven machinery for this purpose that the arm that carries the cutter (the arm 66 of the machine) may be a telescopically extensible and contractible arm, and that by means of a suitably organized guide or master plate the arm may be caused to extend and contract as the spindle that carries it turns; and that thus discs may be cut that are elliptical, oval, or otherwise irregularly shaped. The machine of the invention may, obviously, be so adapted. The term disc may be understood to be inclusive, not of a truly circular cut-out merely, but of cut-outs of the various shapes here indicated.

I claim as my invention:

1. In a machine for cutting a disc from a sheet of glass, the combination of a frame, a rotatable spindle borne by the frame and equipped with a cutting tool, means for yieldingly exerting rotative stress upon said spindle, and means for causing the spindle in response to such stress to turn through one complete rotation and stop, said last-named means including, in association with the spindle, a block rotatable coaxially with and independently of said spindle, means tending to rotate the block in direction opposite to the direction of normal spindle rotation, a bolt borne by said block and extensible and retractible in a path parallel to the axis of spindle rotation, the said bolt and the said spindle being interengaged, when the said bolt is extended, in an interengagement permissive of limited relative movement of the engaged parts, a bolt with wedge-shaped tip borne by said frame and extensible and retractible in a path parallel to the axis of spindle rotation, the said block provided with an abutment with which the last-named bolt cooperates, the last-named bolt being retractible in response to the rotation of said spindle.

2. In a machine for cutting a disc from a sheet of glass, the combination of a frame, a rotatable and axially reciprocable spindle supported by the frame and equipped with a cutting tool, means for yieldingly exerting rotative stress upon said spindle, means for reciprocating said spindle, and means for causing the spindle in response to said rotative stress to turn through one complete rotation and stop, said last-named means including, in association with the spindle, a block rotatable coaxially with and independently of the spindle, means tending to rotate the block in direction opposite to the direction of normal spindle rotation, two bolts borne one by said block and one by said frame and reciprocable in paths parallel to the axis of spindle rotation to and from engagement with spindle and block respectively, the engagement of the block-borne bolt with the spindle permitting relative movement rotationally of the interengaged parts, and the engagement of the frame-borne bolt with the block being a wedging engagement, means coordinated with spindle reciprocation for effecting the retraction of the first bolt, and means coordinated with spindle rotation for effecting the retraction of the second bolt.

3. In a machine for cutting a disc from a sheet of glass, the combination of a frame, a rotatable and axially reciprocable spindle supported by the frame and equipped with a cutting tool, means for yieldingly exerting rotative stress upon said spindle, means for reciprocating said spindle, and means for causing the spindle in response to said rotative stress to turn through one complete rotation and stop, said last-named means including, in association with the spindle, a block rotatable coaxially with and independently of the spindle, means tending to rotate the block in direction opposite to the direction of normal spindle rotation, two bolts borne one by said block and one by said frame and reciprocable in paths parallel to the axis of spindle rotation to and from engagement with spindle and block respectively, the engagement of the block-borne bolt with the spindle permitting relative movement rotationally of the interengaged parts, and the engagement of the frame-borne bolt with the block being a wedging engagement, and. means coordinated with spindle reciprocation for effecting the alternate retraction and extension of the first bolt.

4. In a machine for cutting a disc from a sheet of glass, the combination of a rotatable sleeve and a spindle axially reciprocable in said sleeve, a cutting tool carried by said spindle, means for yieldingly exerting rotative stress upon said sleeve, and means for causing the sleeve in response to said rotative stress to turn through a complete rotation and stop, said means including a bolt extensible and retractible to and from stress resisting engagement with said sleeve, a wedge-shaped notch in said sleeve, and means borne by said spindle and adapted in response to axial movement of the spindle to make wedged engagement with said notch, whereby the spindle and sleeve are united with precision for common rotation.

5. In a machine including a support for a sheet of glass and a revoluble tool for cutting a disc from said sheet, the combination of means for yieldingly moving said tool into engagement with a sheet of glass on said support, means for revolving said tool in contact with said glass, means effective while said tool is revolving for maintaining substantially constant pressure between the tool and the glass, means operable when said tool has completed a revolution for cracking-out the disc cut in said sheet, and stacking means arranged to receive the detached disc.

6. In a disc-cutting machine including a support for a sheet of glass, a cutting tool, and a rotary spindle, the combination of a tool carrier, means for yieldingly securing said tool carrier to said spindle at an interval from the axis of spindle rotation, means for axially moving said spindle and yieldingly bringing said tool to bear upon a sheet of glass on said support, means for automatically rotating said spindle and turning said tool through a disc-cutting revolution, means operable when said tool has completed such revolution for cracking-out from the sheet the disc within the cut, and means for receiving the detached disc.

7. In a disc-cutting machine including a support for a sheet of glass, a rotary spindle, a cutting tool carried by said spindle, a motor, and driving connections between the motor and the spindle adapted to exert continuous stress tending to rotate said spindle, the combination of a bolt normally opposing said rotative stress and securing said spindle against rotation, means for moving said spindle axially to bring said tool to bear upon a sheet of glass on said support, means automatically effective when said tool engages said glass for shifting said bolt and releasing said spindle to said rotative stress, means effective a predetermined interval after the rotation of said spindle has begun for automatically restoring said bolt into stress-opposing position, whereby, when said tool has turned through a disc-cutting revolution of 360 degrees, rotation of said spindle is interrupted, and yielding means interposed between said tool and said spindle for maintaining during such rotation of the spindle substantially constant pressure of the tool on the glass.

8. In a disc-cutting machine including a support for a sheet of glass, a rotary spindle, a cutting tool carried by said spindle, a motor, and driving connections between the motor and the spindle adapted to exert continuous stress tending to rotate said spindle, the combination of a bolt normally opposing said rotative stress and securing said spindle against rotation, means for moving said spindle axially to bring said tool to bear upon a sheet of glass on said support, means automatically effective when said tool engages said glass for shifting said bolt and releasing said spindle to said rotative stress, means effective a predetermined interval after the rotation of said spindle has begun for automatically restoring said bolt into stress-opposing position, whereby, when said tool has turned through a disc-cutting revolution of 360 degrees, rotation of said spindle is interrupted, and yielding means interposed between said tool and said spindle for maintaining during such rotation of the spindle substantially constant pressure of the tool on the glass, and means effective when said spindle has turned said tool through such revolution for cracking-out the disc cut in said sheet, together with stacking means for receiving the disc.

9. A glass-cutting machine including a rotary spindle, a cutting tool, and means for mounting said tool eccentrically of said spindle, said means including a member extending radially from said spindle and secured to rotate in unison therewith, a tool carrier mounted upon said radially-extending member and movable in opposite directions transversely of such member, and yielding means arranged to resist movement of said tool carrier in one of said opposite directions.

10. A glass-cutting machine including a rotary spindle, a cutting tool, and means for mounting said tool eccentrically of said spindle, said means including a member extending radially from said spindle and secured to rotate in unison therewith, a tool carrier, a plurality of wheels rotatably mounted on said radially extending member for securing said tool carrier to said member, while admitting of movement of said tool carrier in opposite directions transversely of said member, and yielding means arranged between said member and said tool carrier.

11. A glass-cutting machine including a cutting tool, a rotatably supported radial member, means for rotating said radial member, a tool carrier, means for securing said tool carrier to said radial member eccentrically of its axis of rotation, while admitting of movement of the carrier in opposite directions transversely of the radial member, and means for yieldingly resisting such movement of the tool carrier, as described.

12. A glass-cutting machine including a support for a sheet of glass, a cutting tool, a rotatably mounted radial member, means for rotating said radial member, a tool carrier yieldingly secured to said radial member, means for yieldingly moving said radial member to bring said tool to bear upon the surface of said sheet of glass, and means effective between said tool carrier and said radial member for maintaining substantially constant pressure of the tool against the glass.

13. In a machine including a cutting tool and means for revolving said tool to cut a disc in a sheet of glass, the combination of means for cracking-out the disc cut in said sheet.

14. In a glass-cutting machine including a support for a sheet of glass, a cutting tool, means for shifting said tool into engagement with the glass, and means for revolving the tool to cut a disc in the sheet of the glass, the combination of means operating in coordination with said tool-revolving means for cracking-out the disc cut in said sheet.

15. The structure of claim 13, in which said cracking-out means include an electro-magnet, an energizing circuit therefor, and circuit-closing means operative in coordination with the glass-cutting operation of said tool.

16. The structure of claim 14, in which said glass support includes a passage for the reception of the discs removed from said sheet.

17. The structure of claim 14, in which said glass support includes a passage for the reception of the discs removed from said sheet, and means organized with said passage for mechanically stacking such discs.

18. In a glass-cutting machine including a cutting tool, a rotary spindle for supporting said tool, a motor, and driving connections between the motor and the spindle adapted to exert continuous torque upon said spindle, the combination of a bolt extensible and rectractible to and from torque-opposing engagement with said spindle, means for moving said tool longitudinally of its axis of rotation, electro-magnetic means for retracting said bolt, an energizing circuit for said electro-magnetic means, and circuit-controlling means automatically operable in coordination with the movement of the tool longitudinally of its axis of rotation.

19. In a glass-cutting machine including a cutting tool, a rotary spindle for supporting said tool, a motor, and driving connections between the motor and the spindle adapted to exert continuous torque upon said spindle, the combination of a bolt extensible and retractible to and from torque-opposing engagement with said spindle, means for moving said tool longitudinally of its axis of rotation, electro-magnetic means for retracting said bolt, an energizing circuit for said electro-magnetic means, circuit-closing means and circuit-interrupting means alternately operable in coordination with the glass-cutting rotations of said tool.

20. In a machine for cutting discs from a sheet of glass, the combination of a support, a revoluble tool for cutting a disc from a sheet of glass positioned on said support, and means operable when said tool has completed a revolution for cracking-out the disc cut in said sheet.

NORMAN H. KLAGES.